US010211725B1

(12) United States Patent
Piccardi

(10) Patent No.: US 10,211,725 B1
(45) Date of Patent: *Feb. 19, 2019

(54) ELECTRONIC DEVICE WITH A CHARGING MECHANISM

(71) Applicant: Micron Technology, Inc., Boise, ID (US)

(72) Inventor: Michele Piccardi, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,444

(22) Filed: Jun. 28, 2018

Related U.S. Application Data

(63) Continuation of application No. 15/849,137, filed on Dec. 20, 2017.

(51) Int. Cl.
*H02M 3/07* (2006.01)

(52) U.S. Cl.
CPC .................... *H02M 3/07* (2013.01)

(58) Field of Classification Search
CPC ... H02M 2003/076; H02M 3/073; H02M 3/07
See application file for complete search history.

(56) References Cited

U.S. PATENT DOCUMENTS

| | | | |
|---|---|---|---|
| 4,311,923 A | 1/1982 | Luescher et al. | |
| 5,043,858 A * | 8/1991 | Watanabe | G11C 5/145 |
| | | | 307/110 |
| 5,381,051 A * | 1/1995 | Morton | H02M 3/073 |
| | | | 326/88 |
| 5,493,486 A | 2/1996 | Connell et al. | |
| 5,818,289 A | 10/1998 | Chevallier et al. | |
| 5,936,459 A | 8/1999 | Hamamoto | |
| 6,046,626 A | 4/2000 | Saeki et al. | |
| 6,545,529 B2 | 4/2003 | Kim | |
| 6,806,761 B1 | 10/2004 | Aude | |
| 7,116,154 B2 | 10/2006 | Guo | |
| 7,239,193 B2 | 7/2007 | Fukuda | |
| 7,576,523 B2 | 8/2009 | Ogawa et al. | |

(Continued)

OTHER PUBLICATIONS

U.S. Appl. No. 15/849,052—Unpublished patent application by Michele Piccardi, titled "Electronic Device With an Output Voltage Booster Mechanism", filed Dec. 20, 2017, 32 pages.

(Continued)

*Primary Examiner* — Thomas J. Hiltunen
(74) *Attorney, Agent, or Firm* — Perkins Coie LLP

(57) ABSTRACT

An electronic device includes: a clock booster including a doubler capacitor, the clock booster configured to precharge the doubler capacitor and provide a boosted intermediate voltage greater than an input voltage; a secondary booster including a booster capacitor, the secondary booster configured to use the voltage stored on the doubler capacitor to generate a stage output greater than the boosted intermediate voltage; and a connecting switch connected to the clock booster and the secondary booster, the connecting switch configured to electrically connect the doubler capacitor and the booster capacitor during a direct charging duration for charging the booster capacitor using source-secondary current from an input voltage supply instead of or in addition to the voltage stored on the doubler capacitor.

7 Claims, 7 Drawing Sheets

(56) References Cited

U.S. PATENT DOCUMENTS

| | | |
|---|---|---|
| 7,602,233 B2 | 10/2009 | Pietri et al. |
| 7,652,522 B2 | 1/2010 | Racape |
| 7,994,844 B2 | 8/2011 | Chen et al. |
| 8,026,755 B2 | 9/2011 | Ni et al. |
| 9,502,972 B1 | 11/2016 | Michal et al. |
| 9,793,794 B2 | 10/2017 | Stauth et al. |
| 2006/0290411 A1 | 12/2006 | Smith et al. |
| 2007/0035973 A1 | 2/2007 | Kitazaki et al. |
| 2008/0012627 A1 | 1/2008 | Kato |
| 2008/0122506 A1 | 5/2008 | Racape |
| 2009/0108915 A1 | 4/2009 | Liao |
| 2009/0121780 A1 | 5/2009 | Chen et al. |
| 2009/0174441 A1 | 7/2009 | Gebara et al. |
| 2013/0222050 A1 | 8/2013 | Siao |
| 2015/0015323 A1* | 1/2015 | Rahman ............... H02M 3/073 327/536 |
| 2016/0268893 A1 | 9/2016 | Dong et al. |
| 2017/0317584 A1 | 11/2017 | Tanikawa |
| 2018/0191243 A1 | 7/2018 | Shay et al. |

OTHER PUBLICATIONS

U.S. Appl. No. 15/849,098—Unpublished patent application by Michele Piccardi, titled "Electronic Device With a Charge Recycling Mechanism", filed Dec. 20, 2017, 31 pages.

* cited by examiner

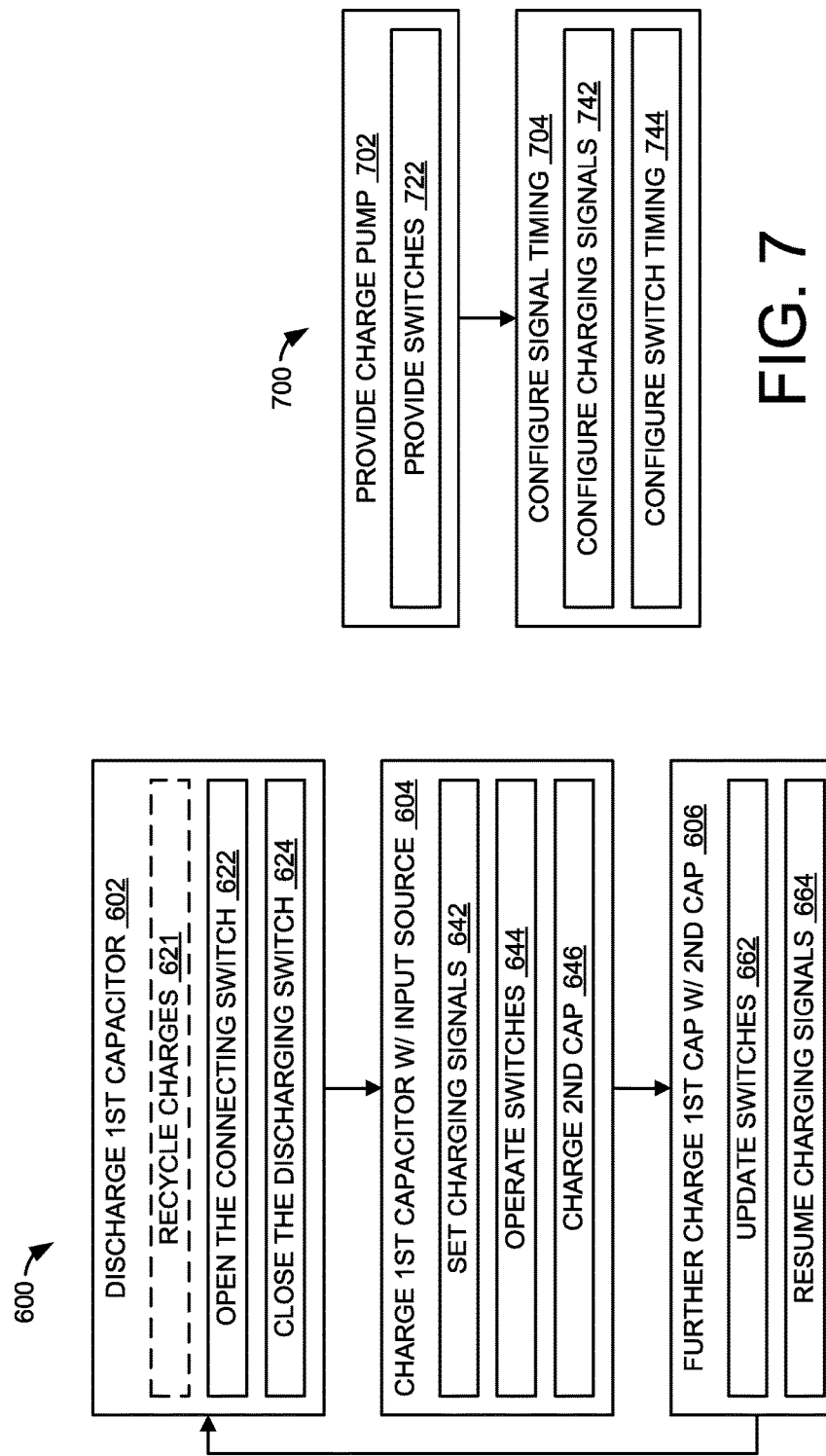

US 10,211,725 B1

ELECTRONIC DEVICE WITH A CHARGING MECHANISM

RELATED APPLICATION(S)

This application is a continuation of U.S. application Ser. No. 15/849,137, filed Dec. 20, 2017, which is incorporated herein by reference in its entirety.

This application contains subject matter related to an Application by Michele Piccardi titled "ELECTRONIC DEVICE WITH AN OUTPUT VOLTAGE BOOSTER MECHANISM." The related application is assigned to Micron Technology, Inc., and is identified as U.S. Application No. 15/849,052, filed Dec. 20, 2017. The subject matter thereof is incorporated herein by reference thereto.

This application contains subject matter related to an U.S. Patent Application by Michele Piccardi titled "ELECTRONIC DEVICE WITH A CHARGE RECYCLING MECHANISM." The related application is assigned to Micron Technology, Inc., and is identified as U.S. Application No. 15/849,098, filed Dec. 20, 2017. The subject matter thereof is incorporated herein by reference thereto.

TECHNICAL FIELD

The disclosed embodiments relate to electronic devices, and, in particular, to semiconductor devices with a charging mechanism.

BACKGROUND

Electronic devices, such as semiconductor devices, memory chips, microprocessor chips, and imager chips, can include a charge pump (e.g., a DC to DC converter that functions as a power source) to create a voltage that is different (e.g., higher or lower) than the available source voltage (e.g., '$V_{dd}$'). Charge pumps can include components (e.g., diodes, switches, comparators, capacitors, resistors, or a combination thereof) that are organized to provide an output voltage that is boosted or reduced from an incoming source voltage.

Some charge pumps can include components arranged in units or stages (e.g., such that the connections between or relative arrangements of the units can be reconfigured to adjust one or more capabilities of the charge pump). FIG. 1A illustrates a single stage of a charge pump in an electronic device 101. In a pre-charge phase, an energy storage structure (e.g., one or more capacitors, represented as '$C_p$') in the single stage can be charged using an incoming voltage (e.g., '$V_{in}$'). As illustrated in FIG. 1B, the charged storage structure can be reconfigured (e.g., using one or more relays or switches) from a parallel connection with the voltage supply for the pre-charge phase to a series connection with the voltage supply for a boost phase. Accordingly, a resulting output (e.g., '$V_{out}$') can be higher (e.g., '$2V_{in}$') than the incoming voltage level (e.g. '$V_{in}$').

The output voltage can be used to drive a load as illustrated in FIG. 1C. The boosted output can be connected to the electrical load. The load can draw a current (e.g., as represented '$I_{load}$') and/or a drive a load capacitance (e.g., as represented by a capacitance '$C_{load}$'). As such, when the load is connected to the charge pump, the output voltage (e.g., '$V_{out}$') can drop according to the pump capability. In providing the output voltage, charges stored on one or more energy storage structures (e.g., capacitors) can be routed to ground during charging cycles and then recharge from zero voltage.

BRIEF DESCRIPTION OF THE DRAWINGS

FIG. 6 is a flow diagram illustrating an example method of operating an electronic device in accordance with an embodiment of the present technology.

FIG. 7 is a flow diagram illustrating an example method of manufacturing an electronic device in accordance with an embodiment of the present technology.

DETAILED DESCRIPTION

The technology disclosed herein relates to electronic devices (e.g., semiconductor-level devices, sets of analog circuitry components, etc.), systems with electronic devices, and related methods for operating electronic devices in association with charge pumps and/or voltage booster mechanism (e.g., double boosted charge pumps) therein. The electronic devices can include in each stage a clock booster (e.g., a 2-phase NMOS clock doubler) for initially boosting an input voltage, a switching module for routing the initially boosted voltage, and a secondary booster for further boosting the input voltage using the initially boosted voltage. The electronic devices can operate the circuitry therein to utilize energy from an input source to operate the secondary booster (e.g., for charging the capacitor therein) instead of using only the charges from the clock booster. During a direct charging duration (e.g., after a recycling and/or a discharging duration), such as before a charging phase, the electronic device can connect the secondary booster to the input supply (e.g., through the clock booster) instead of connecting and utilizing the clock booster (e.g., without inputs from the input supply) at the beginning of the charging phase. The electronic device can leverage the input supply to generate stage output voltage in addition to leveraging boosted intermediate voltage from the clock doubler, which has a higher cost to the system/device than the energy from the input supply.

Figure 1A:
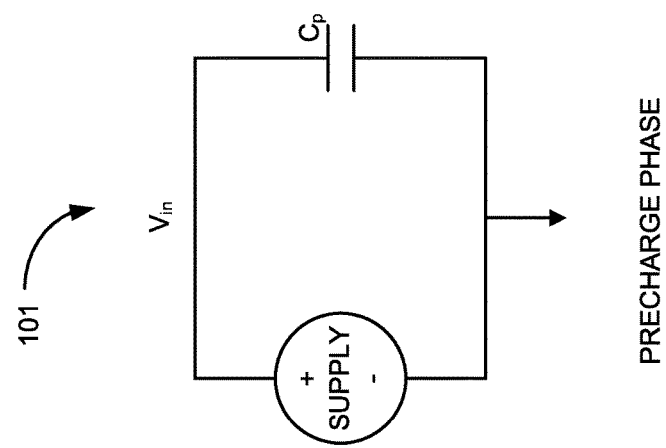
FIGS. 1A-C are block diagrams of an electronic device including a charging mechanism.
Figure 1B:
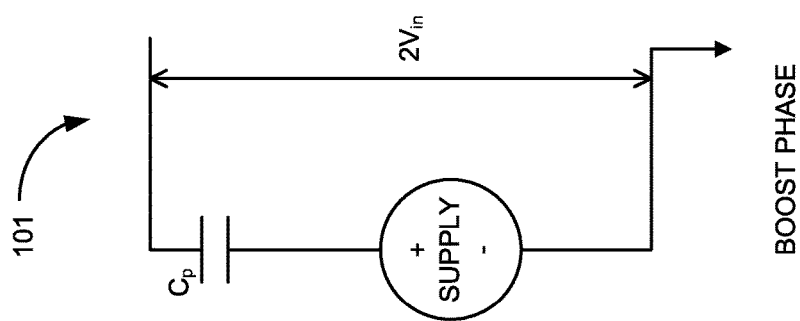
Figure 1C:
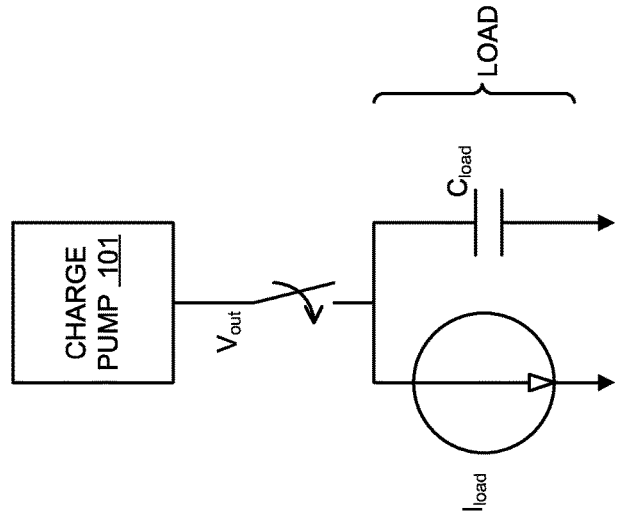
Figure 2:
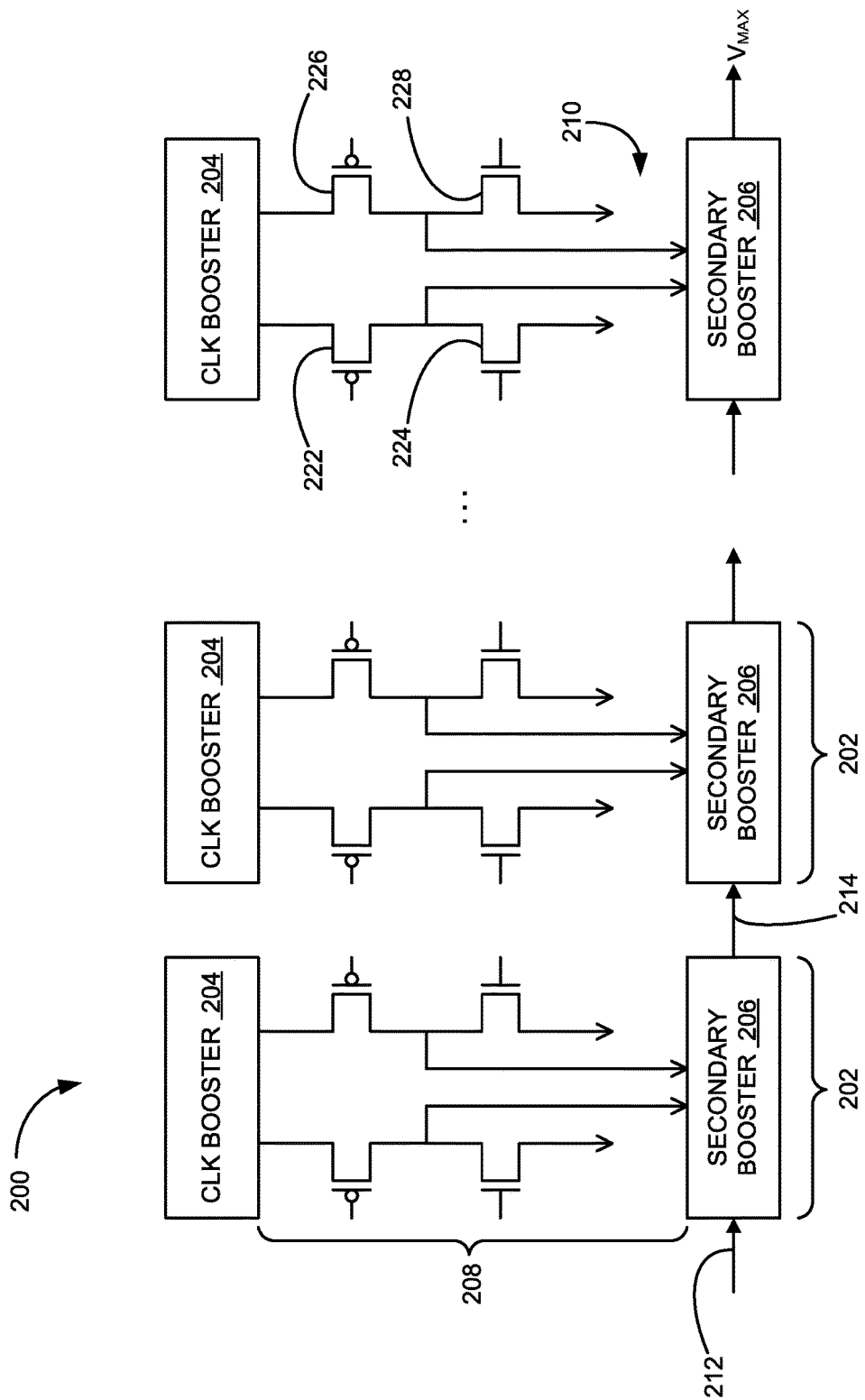
FIG. 2 is a block diagram of an electronic device including a charging mechanism in accordance with an embodiment of the present technology.

FIG. 2 is a block diagram of an electronic device 200 (e.g., a multi-stage charge pump) including a charging mechanism in accordance with an embodiment of the present technology. The electronic device 200 (e.g., a semiconductor device, an integrated circuit, a wafer or silicon level device, a set of digital and/or analog circuitry, etc.) can include a charge pump (e.g., a DC to DC converter, including one or more capacitors to store energy, that functions as a power source using various different internal configurations, arrangements, or electrical connections to provide an output voltage ("$V_{out}$")). The charge pump can include multiple charging stages 202 (e.g., units of circuits, devices, components, etc. configured to produce a voltage greater than the input) connected in series.

Each of the charging stages 202 (e.g., each a double boosted charge pump) can include a clock booster 204 (e.g., an output booster, such as a clock doubler), a secondary booster 206 (e.g., a higher voltage booster circuit, such as a Favrat booster), and a switching module 208 (e.g., a system or a set of switches and electrical connections). The clock booster 204 can be electrically coupled to the secondary booster 206 through the switching module 208. For example, a boosted intermediate voltage 210 (e.g., an intermediate voltage, such as '$2V_{dd}$', that is greater than and/or boosted from a source input voltage, such as '$V_{dd}$') from the clock booster 204 can be routed through the switching module 208 and provided as an input at the secondary booster 206. The secondary booster 206 can use the boosted intermediate voltage 210 from the clock booster 204 to further increase a previous stage input voltage 212 (e.g., '$V_{dd}$' for the first stage or a stage output voltage 214 from a preceding secondary booster for subsequent stages). The stage output voltage 214 resulting from boosting the stage input voltage can be provided as an input voltage to the subsequent stage (e.g., as the stage input to subsequent instance of the secondary booster or as an output to the load).

In some embodiments, the switching module 208 can include multiple switching paths including one or more switches (e.g., parallel paths each including one or more NMOS transistor), one or more complementary switches (e.g., one or more PMOS transistors), or a combination thereof. For example, the switching module 208 can include a first PMOS transistor 222 connected to the clock booster 204 on one end and a first NMOS transistor 224, the secondary booster 206, or a combination thereof on an opposing end. The switching module 208 can further include a second PMOS transistor 226 connected to the clock booster 204 on one end and a second NMOS transistor 228, the secondary booster 206, or a combination thereof on an opposing end.

The charging stages 202 include the clock booster 204 and the switching module 208 (e.g., for providing a voltage greater than the input voltage, such as '$2V_{dd}$') with the secondary booster 206 to provide increased charging efficiency. In comparison to the traditional switch pumps, the charge pump illustrated in FIG. 2 can reduce (e.g., by a factor such as 1.1 or greater, including 2.0 or more) the number of stages (i.e., represented as 'N') necessary to produce the same target voltage and the corresponding resistance. For example, the maximum voltage and the corresponding resistance value of the electronic device 200 can be represented as:

$$V_{max} = V_{dd} + \frac{N}{2} \cdot 2V_{dd}. \qquad \text{Equation (1)}$$

$$R_{out} = \frac{N}{2(f_{clk} \cdot C_p)}. \qquad \text{Equation (2)}$$

Figure 3:
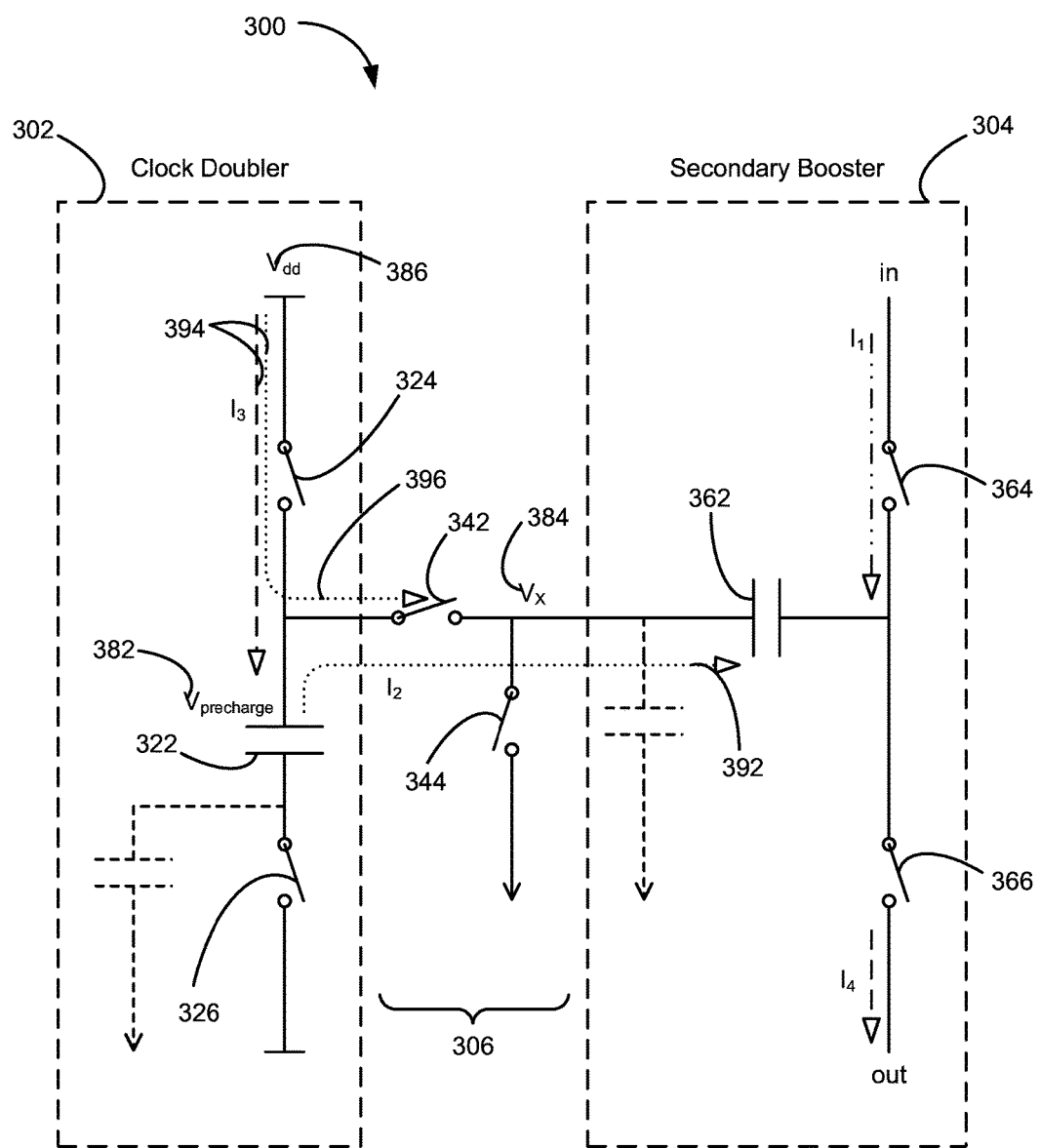
FIG. 3 is an example circuit diagram of an electronic device in accordance with an embodiment of the present technology.

FIG. 3 is an example circuit diagram of an electronic device 300 in accordance with an embodiment of the present technology. The electronic device 300 can include a clock doubler 302 (e.g., similar to the clock booster 204 of FIG. 2), a secondary booster 304 (e.g., similar to the secondary booster 206 of FIG. 2), and a switching module 306 (e.g., similar to the switching module 208 of FIG. 2).

In some embodiments, the clock doubler 302 can include a doubler capacitor 322 connected to a source switch 324 on one node and a doubler charging switch 326 on an opposite node. On nodes opposite the doubler capacitor 322, the source switch 324 can be connected to a power source (e.g., for accessing an input voltage 386, represented as '$V_{dd}$'), and the doubler charging switch 326 can be connected to a periodic signal used to generate the boosted intermediate voltage 210 of FIG. 2.

In some embodiments, the switching module 306 can include a connecting switch 342 for controlling an electrical connection between the clock doubler 302 and the secondary booster 304. When closed or turned on, the connecting switch 342 can connect the clock doubler 302 and the secondary booster 304 (e.g., based on directly connecting the doubler capacitor 322 to the booster capacitor 362 through the connecting switch 342) to provide the boosted output to the secondary booster 304. When open or turned off, the connecting switch 342 can electrically isolate the clock doubler 302 and the secondary booster 304.

The switching module 306 can further include a discharging switch 344 between the connecting switch 342 and the secondary booster 304 configured to discharge energy from the secondary booster 304 to ground. The discharging switch 344 can generally operate in a complementary manner to the connecting switch 342. For example, for the discharging operation, the discharging switch 344 can connect (e.g., based on closing or turning on) the secondary booster 304 to ground when the connecting switch 342 isolates the clock doubler 302 from the secondary booster 304 (e.g., based on opening or turning off). For the charging or boosting operation, the discharging switch 344 can isolate (e.g., based on opening or turning off) the secondary booster from ground when the connecting switch 342 connects the clock doubler 302 and the secondary booster 304 (e.g., based on closing or turning on).

Additionally, for charging the secondary booster 304 (e.g., for generating the stage output 214), the switching module 306 and/or the clock doubler 302 can operate to use the input voltage 386 to charge the booster capacitor 362 (e.g., based on connecting the booster capacitor 362 to the input supply) in addition to using the energy from the doubler capacitor 322. Accordingly, the secondary booster 304 can use an energy source that is more efficient/available (e.g., based on the energy from the input supply having greater availability/capacity) than energy stored in the doubler capacitor 322 through the precharging process.

For example, the secondary booster 304 can use a stage-input current (e.g., represented as '$I_1$') in generating a stage-output current (e.g., represented as '$I_4$' and corresponding to the stage output 214). Further, the secondary booster 304 can use boosted intermediate current 392 (represented as '$I_2$') from the doubler capacitor 322 to the booster capacitor 362 (e.g., based on transferring or sharing the precharging voltage 382 through the connecting switch 342) to generate the final boosted output.

The electronic device 300 can further use source-input current 394 from the input supply (e.g., corresponding to the input voltage 386) to generate the stage-output current/the stage output 214. For example, the clock doubler 302 can use the source-input current 394 to precharge the doubler capacitor 322 (e.g., based on directly connecting the doubler capacitor 322 to the input voltage 386 through the source switch 324). Also for example, the electronic device 300 can use source-secondary current 396 (e.g., a subset of the source-input current 394) to charge the booster capacitor 362. The electronic device 300 can close the connecting switch 342 (e.g., while the source switch 324 is closed and the discharging switch 344 is open) to directly charge the booster capacitor 362 using the input voltage 386.

Figure 4:
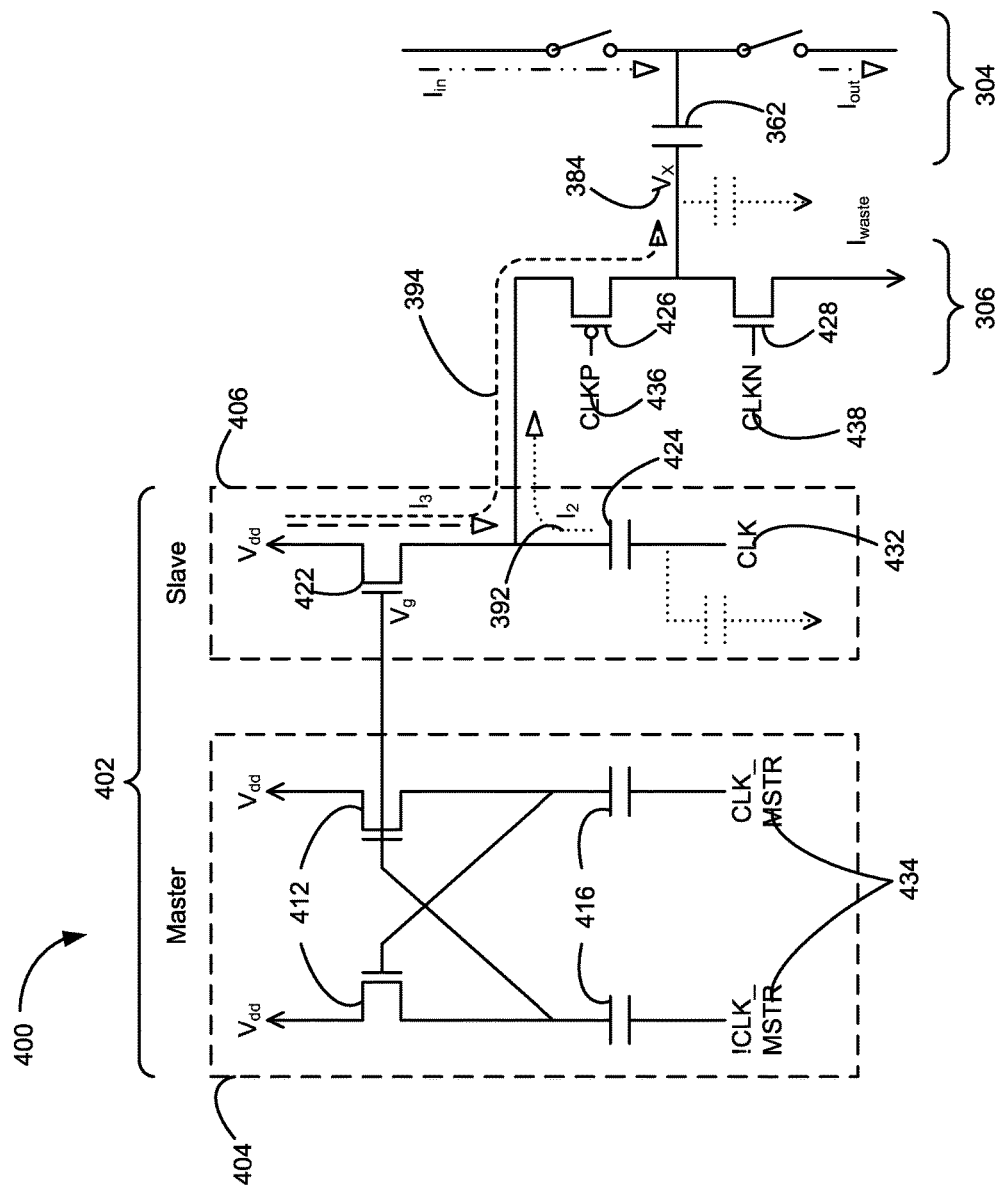
FIG. 4 is a further example circuit diagram of an electronic device in accordance with an embodiment of the present technology.

FIG. 4 is a further example circuit diagram of an electronic device 400 in accordance with an embodiment of the present technology. The electronic device 400 (e.g., double boosted charge pumps utilizing master-slave configuration) can include a clock booster 402 (e.g., similar to the clock doubler 302 of FIG. 3) having a master-controller 404 and a slave-booster 406. The master-controller 404 can be configured to operate the slave-booster 406 (e.g., for controlling the charging operation), and the slave-booster 406 can be configured to drive the load (e.g., the secondary booster 304). For example, the master-controller 404 can include one or more controller switches 412 (e.g., similar to the source switch 324 of FIG. 3 but for control operations instead of the charging/driving operation) connected to one or more controller capacitors 416 (e.g., similar to the doubler capacitor 322 of FIG. 3 but for control operations instead of the charging/driving operation). The controller capacitors 416 can be further connected to gates of the controller switches 412, and can operate based on clock master signals 434 (e.g., represented as 'CLK_MSTR' and '!CLK_MSTR' that represents an opposite or a complementary signal of CLK_MSTR).

The slave-booster 406 can include a driver switch 422 (e.g., similar to the source switch 324 but for the charging/driving operation instead of the control operations) connected to a driver capacitor 424 (e.g., similar to the doubler capacitor 322 but for the charging/driving operation instead of the control operations). For example, a gate of the driver switch 422 can be connected to one of the controller switches 412 and/or one of the controller capacitors 416. The driver capacitor 424 can be controlled based on clock signals 432 (e.g., represented as 'CLK' (not shown) or '!CLK' that represents an opposite or a complementary signal of 'CLK'). The driver capacitor 424 can further have greater capacitance than the controller capacitors 416 (e.g., based on a factor of 10 or more, such as for controlling based on the controller capacitors 416 and for driving the load based on the driver capacitor 424).

The slave-booster 406 can be connected to the secondary booster 304 through the switching module 306 of FIG. 3. For example, the slave-booster 406 can be directly connected to a module first switch 426 (e.g., the connecting switch 342 of FIG. 3, which can be implemented as a PMOS transistor, such as the first PMOS 222 of FIG. 2, the second PMOS 226 of FIG. 2, etc.) in the switching module 306. The module first switch 426 can connect the driver capacitor 424 to the booster capacitor 362 (e.g., for charging the intermediate node voltage 384 and/or recycling the charges on the booster capacitor 362 for the precharging process).

The switching module 306 can further include a module second switch 428 (e.g., the discharging switch 344 of FIG. 3, which can be implemented as an NMOS transistor, such as the first NMOS 224 of FIG. 2, the second NMOS 228 of FIG. 2, etc.) for discharging the intermediate node voltage 384. The module second switch 428 can connect the booster capacitor 362 to ground or a lower potential/voltage node. The switching module 306 can include the module first switch 426 and/or the module second switch 428 instead of a simple inverter.

The switching module 306 can operate the switches based on a module first signal 436, a module second signal 438, or a combination thereof. The module first signal 436 can operate the module first switch 426 and the module second signal 438 can operate the module second switch 428. For example, the module first signal 436 can connect the module first switch 426 (e.g., based on turn the switch on) for a charging/driving process (e.g., triggered by a rising or falling edge of one or more of the clock master signals 434 and/or the clock signals 432). The module first signal 436 can connect the module first switch 426 to route the source-secondary current 396 to the booster capacitor 362 for the charging/driving process (e.g., after discharging the booster capacitor 362, during a direct charging duration, prior to or concurrently with a precharging process, or a combination thereof). The module second signal 438 can connect the module second switch 428 for a discharging process.

For illustrative purposes, the electronic device is shown in FIG. 3 and FIG. 4 with one path/circuit set for the clock doubler 302 and the secondary booster 304. However, it is understood that the circuits can be mirrored (e.g., one set corresponding to one of the clock signals and/or one of the clock master signals and the mirroring set corresponding to the other or complementary/negated form of the clock signal).

Also for illustrative purposes, non-ideal losses to ground (e.g., corresponding to capacitor implementations, such as residual substrate capacitances for CMOS implementations) for the boosting and/or clock-doubler capacitors have been shown as dotted lines representing capacitances to ground. The direct charging operations discussed herein (e.g., charging the booster capacitor 362 using the source-secondary current 396 instead of or in addition to the boosted intermediate current 392) can compensate for the non-ideal losses in the clock-doubler capacitors and/or the secondary booster capacitors.

Figure 5:
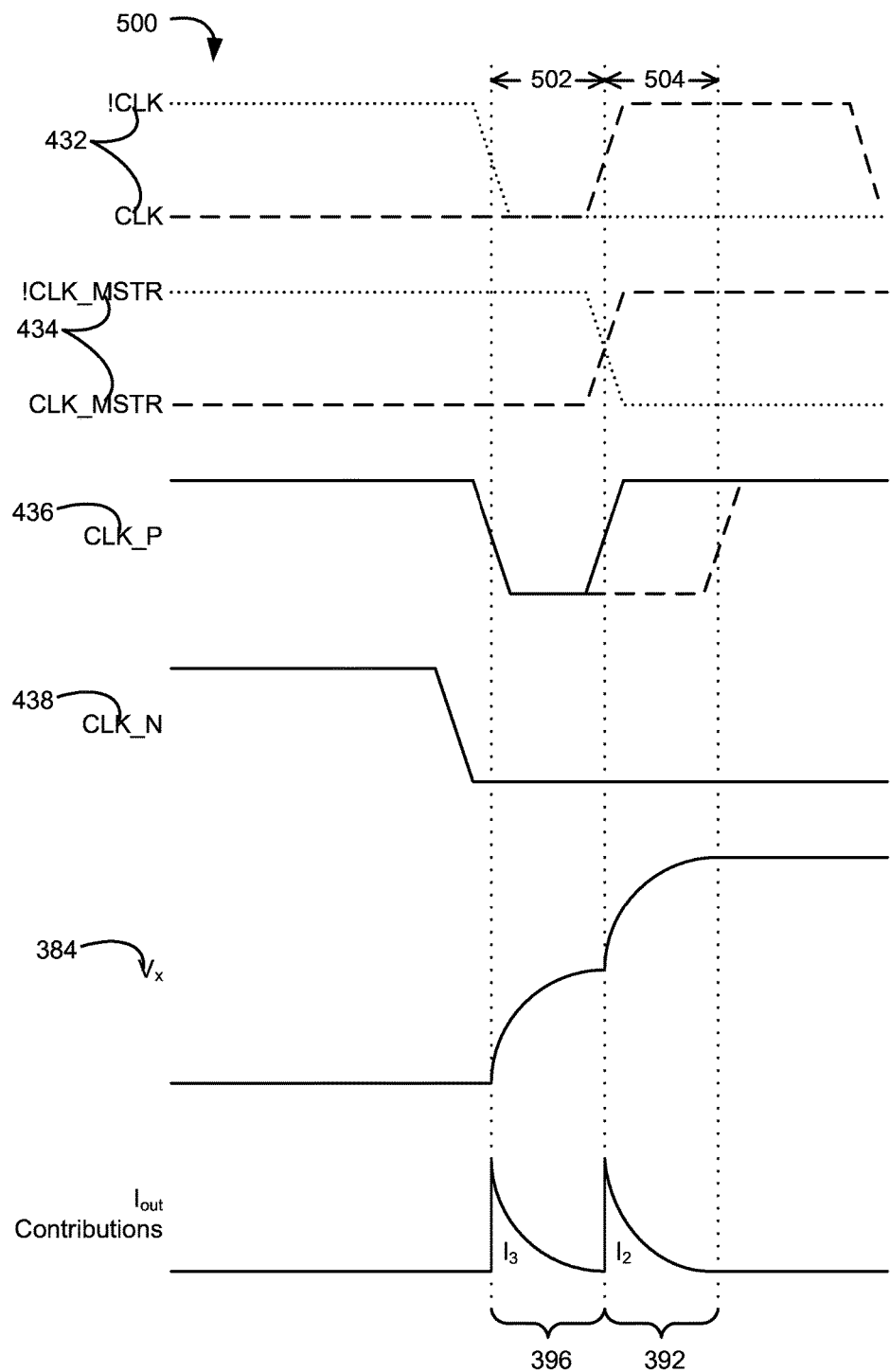
FIG. 5 is an example timing diagram for an electronic device in accordance with an embodiment of the present technology.

FIG. 5 is an example timing diagram 500 for an electronic device (e.g., the electronic device 200 of FIG. 2, the electronic device 300 of FIG. 3, the electronic device 400 of FIG. 4, etc.) in accordance with an embodiment of the present technology. The example timing diagram 500 can illustrate an example relationship (e.g., a temporal relationship) between input signals, such as the clock signals 432 (e.g., the clock signal, such as CLK used to charge the driver capacitor 424 as illustrated in FIG. 4, and the negated signal), the clock master signals 434 (e.g., the clock master signal and the negated master signal, such as !CLK_MSTR used to control the slave-booster 406 of FIG. 4 or a portion thereof as illustrated in FIG. 4), the module first signal 436 represented as 'CLK_P,' the module second signal 438 represented as 'CLK_N,' or a combination thereof. The example timing diagram 500 can be for operating the clock doubler 302 of FIG. 3 (e.g., the master-controller 404 of FIG. 4 and/or the slave-booster 406 of FIG. 4 of the clock booster 402 of FIG. 4), the switching module 306 of FIG. 3, a portion thereof, or a combination thereof illustrated in FIG. 4.

The timing for input signals can be based on a direct charging duration 502 (e.g., a duration for directly charging the booster capacitor 362 of FIG. 3 using the source-secondary current 396 instead of or in addition to the boosted intermediate current 392), a continued charging duration 504 (e.g., a duration for charging the booster capacitor 362 using the boosted intermediate current 392). The continued charging duration 504 can immediately follow the direct charging duration 502. In some embodiments, the direct charging duration 502 can be a duration lasting 0.1 ns or more.

The input signals can keep or operate the connecting switch 342 of FIG. 3 (e.g., the module first switch 426 of FIG. 4) closed while the bottom plate of the driver capacitor 424 is pulled low and/or the bottom plate of the control capacitor controlling the driver switch 422 for the driver capacitor 424 is high (e.g., while the gate voltage for the driver switch 422 is also high). For example, the clock signals 432 (e.g., both the clock signal and the negated signal) can be low during the direct charging duration 502 to pull the lower plate of the driver capacitors low. The clock master signals 434 (e.g., both the master clock signal and the negated master signal) can remain in their signal states during the direct charging duration 502. The clock master signal that is for controlling the slave-booster 406 (or a portion thereof) can remain high during the direct charging duration 502. In reference to FIG. 4 and FIG. 5, the !CLK_MSTR signal (e.g., for controlling the driver switch 422 connected to the driver capacitor 424) can remain high during the direct charging duration 502 while the clock signals 432 (e.g., both the CLK and !CLK) remain low. Accordingly, the gate voltage for the driver switch 422 (e.g., '$V_g$') can be high.

Also during the direct charging duration 502, the module first signal 436 can be low (e.g., for PMOS, a negative pulse with a pulse width equal to the direct charging duration 502) for connecting the module first switch 426. The source switch 324 of FIG. 3 (e.g., the driver switch 422) can be closed at the beginning of the direct charging duration 502. Accordingly, the source-secondary current 396 can be routed to the booster capacitor 362 for charging the booster capacitor 362 and increasing the intermediate node voltage 384 (e.g., after a discharging process where the discharging switch 344, such as the module second switch 428 was on based on the module second signal 438).

After the direct charging duration 502, the electronic device can further charge the booster capacitor 362 during the continued charging duration 504 (e.g., for routing the boosted intermediate current 392 to the booster capacitor 362 to further charge the booster capacitor 362). The electronic device can keep the module first switch 426 closed after the direct charging duration 502 and through the continued charging duration 504. In some embodiments, the electronic device can keep the module first switch 426 closed based on maintaining the module first signal 436 (e.g., at low signal level for PMOS connecting switch) beyond the direct charging duration 502 and through the continued charging duration 504.

In some embodiments, the electronic device can keep the module first switch 426 closed based on voltage levels at the terminals of the module first switch 426 (e.g., without maintaining the module first signal 436, such as by reverting the module first signal 436 back to the high level for the PMOS connecting switch). For example, the drain of the module first switch 426 can be connected to the booster capacitor 362, and thereby connected to the intermediate node voltage 384 (e.g., charged to $2V_{dd}$ based on the source-secondary current 396) that is stored on the booster capacitor 362. After the direct charging duration 502, the electronic device can return the module first signal 436 to the previous level (e.g., at high signal level for PMOS connecting switch before the direct charging duration 502), and the module first switch 426 can remain connected based on a voltage difference between the source and the drain (e.g., source action) of the module first switch 426 (e.g., $V_{dd}$ at the drain/the booster capacitor 362 and $2V_{dd}$ at the source/input source through the source switch 324).

Also at the end of the direct charging duration 502 and/or at the beginning of the continued charging duration 504, one of the clock signals 432 (e.g., the clock signal connected to the corresponding doubler capacitor, such as CLK as illustrated in FIG. 4) can go high for precharging the doubler capacitor 322 (e.g., the driver capacitor 424). Further, the corresponding clock master signal (e.g., the clock master signal connected to and controlling the source switch 324/the driver switch 422, such as !CLK_MSTR as illustrated in FIG. 4) can go low after direct charging duration 502 and/or at the beginning of the continued charging duration 504. Accordingly, the input source can be isolated from the booster capacitor 362 (e.g., corresponding to the clock master signals 434 opening the source switch 324/the driver switch 422), and the booster capacitor 362 can be charged based on the doubler capacitor 322/the driver capacitor 424 and the clock signals 432.

Using the input source to charge the booster capacitor 362 using the source-secondary current 396 (e.g., based on keeping the source switch 324 closed and further closing the connecting switch 342 during the continued charging duration 504) instead of and/or in addition to the boosted intermediate current 392 provides increase current efficiency. Accordingly, charging the booster capacitor 362 using the source-secondary current reduces over-stress for the clock doubler 302/the clock booster 402 (e.g., the lower voltage booster device).

FIG. 6 is a flow diagram illustrating an example method 600 of operating an electronic device in accordance with an embodiment of the present technology. The method 600 can be for operating the electronic device 200 of FIG. 2, the electronic device 300 of FIG. 3, the electronic device 400 of FIG. 4, a portion therein, or a combination thereof.

At block 602, the electronic device (e.g., a charge pump, such as a double-boosted charge pump) can initiate (e.g., using the clock booster 204 of FIG. 2, the clock doubler 302 of FIG. 3, the clock booster 402 of FIG. 4, a state machine or a controller circuit, etc.) the discharging operation based on discharging a first capacitor (e.g., the doubler capacitor 322 of FIG. 3, the driver capacitor 424 of FIG. 4, etc.). The electronic device can discharge the booster capacitor 362 of FIG. 3, such as at an end of a signal period/cycle (e.g., after generating the stage output 214 of FIG. 2 at the secondary booster 206 of FIG. 2 and/or the secondary booster 304 of FIG. 3) or before the direct charging duration 502.

In some embodiments, such as represented by block 621, the electronic device can recycle charges from the secondary booster 304 (e.g., from the first capacitor, such as the booster capacitor 362) to the clock doubler 302 (e.g., to the second capacitor, such as the doubler capacitor 322 or the driver capacitor 424). For example, the electronic device can control the charging signals, such as by driving the control signals low and maintaining the clock master signals (e.g., maintaining the corresponding clock master signal low) and/or by controlling the switch operations (e.g., closing the connecting switch 342 of FIG. 3 and/or opening the discharging switch 344 of FIG. 3).

For discharging, at block 622, the electronic device can open the connecting switch (e.g., the connecting switch 342, such as the module first switch 426 of FIG. 4). The electronic device can isolate the secondary booster 304 from the clock doubler 302 (e.g., also electrically isolating the booster capacitor 362 from the input supply, the clock signals 432 of FIG. 4 and/or the clock master signals 434 of FIG. 4).

Also for discharging, at block 624, the electronic device can close the discharging switch (e.g., the discharging switch 344, such as the module second switch 428). The electronic device can connect the secondary booster 304 (e.g., after opening the connecting switch) to ground or a node with voltage level lower than the booster capacitor 362. Accordingly, the electronic device can discharge or remove the charges/energy stored in the booster capacitor 362 through the discharging switch.

At block 604, the electronic device can charge the first capacitor with the input source. The electronic device can electrically connect the input source (e.g., the input voltage 386 of FIG. 3) to the booster capacitor 362, set the charging signals, etc. Accordingly, after discharging the booster capacitor 362, the electronic device can charge the booster capacitor 362 based the source-secondary current 396 of FIG. 3 from the input source.

For charging the first capacitor, at block 642, the electronic device can set charging signals. At the beginning of and/or during the direct charging duration 502, the electronic device can drive the clock signals 432 low and/or maintain the clock master signals 434 at the preceding levels. For example, the electronic device can maintain the charging signal used to charge the corresponding drive capacitor (e.g., the CLK signal as illustrated in FIG. 4 at a low state/level) and drive the complementary signal (e.g., the !CLK signal) low during the direct charging duration 502. Also for example, the electronic device can maintain the clock master signals 434 (e.g., the signal configured to control the corresponding driver switch, such as the !CLK_MSTR signal in FIG. 4, at high) during the direct charging duration 502.

Also for charging the first capacitor, at block 644, the electronic device can operate one or more switches to charge the first capacitor with the input source. At the beginning of and/or during the direct charging duration 502 (e.g., after discharging), the electronic device can keep the source switch 324 of FIG. 3 closed (e.g., based on maintaining the clock master signals 434 at a corresponding state, such as at a high state as discussed above). Also at the beginning of and/or during the direct charging duration 502, the electronic device can close the connecting switch 342 (e.g., the module first switch 426), such as based on controlling the module first signal 436 of FIG. 4 (e.g., driving the signal low for controlling a PMOS switch) corresponding to the voltage at a control node (e.g., gate voltage) of the connecting switch 342.

Accordingly, the electronic device can directly connect the first capacitor (e.g., the booster capacitor 362) to the input source through the source switch 324 and the connecting switch 342. Similarly, the electronic device can directly connect the second capacitor (e.g., the doubler capacitor 322) to the input source through the source switch 324 during the direct charging duration 502. Through the direct connections, the electronic device can charge the first capacitor, the second capacitor, such as at block 646, or a combination thereof directly using the input voltage 386 (e.g., using the source-input current 394, including the source-secondary current 396 to charge the booster capacitor 362). For example, the electronic device can charge the booster capacitor 362, the doubler capacitor 322, or a combination thereof to the same voltage as the input voltage (e.g., $V_{dd}$).

At block 606, the electronic device can further charge the first capacitor with or using the second capacitor after the direct charging duration 502 (e.g., during the continued charging duration 504). For example, the electronic device can further charge the booster capacitor 362 based on charges stored on the doubler capacitor 322. Also for example, the electronic device can further charge the booster capacitor 362 based on updating or adjusting one or more switches, controlling or resuming the charging signals, or a combination thereof.

For further charging the first capacitor, at block 662, the electronic device can update one or more switches. For example, the electronic device can open the source switch 324 and isolate the doubler capacitor 322 from the input source for generating the boosted intermediate voltage 210 of FIG. 2 at the doubler capacitor 322 that is higher or greater (e.g., $2V_{dd}$) than the input voltage 386 (e.g., using the charging signals, such as the clock signals 432). The source switch 324 can be operated according to the control signals (e.g., the clock master signals 434 and corresponding changes to gate voltages for the source switch 324).

Also for example, the electronic device can keep the connecting switch 342 closed (e.g., for directly connecting the booster capacitor 362 to the doubler capacitor 322). In some embodiments, the electronic device can keep the connecting switch 342 (e.g., the module first switch 426) closed based on maintaining the module first signal 436 or the corresponding voltage at the control node (e.g., keeping the gate voltage at low for PMOS switches, such as illustrated in FIG. 4) past the direct charging duration 502 and through the continued charging duration 504. In some embodiments, the electronic device can keep the connecting switch 342 based on voltages at input and output terminals thereof (e.g., relying on the source action without relying on the module first signal 436). The electronic device can switch states of the module first signal 436 and revert the voltage at the control node of the connecting switch 342 to the state prior to the direct charging duration (e.g., return the gate voltage to high state for PMOS switches, such as illustrated in FIG. 4). The connecting switch 342 can remain closed based on the voltage difference between the source and the drain of the connecting switch 342 (e.g., $V_{dd}$ at the drain/the booster capacitor 362 and $2V_{dd}$ at the source/input source through the source switch 324).

At block 664, the electronic device can resume the charging signals (e.g., one or more of the clock signals 432, one or more of the clock master signals 434, etc.). For example, at the end of the direct charging duration 502 and/or the beginning of the continued charging duration 504, the electronic device can transition one of the clock signals 432 (e.g., CLK signal as illustrated in FIG. 4) high for boosting the charges stored on the doubler capacitor 322 (e.g., the driver capacitor 424). Also for example, the electronic device can transition the clock master signals 434 including driving the controlling clock master signal (e.g., !CLK_MSTR signal as illustrated in FIG. 4) low for opening the source switch 324 (e.g., the driver switch 422).

According to the charging signals and the switch operations, the electronic device can further charge the booster capacitor 362 using the boosted intermediate voltage 210 at the doubler capacitor 322. The rise in the clock signal can provide the boosted intermediate voltage 210 greater than the input voltage 386 at the doubler capacitor 322. The corresponding charges can transfer from the doubler capacitor 322 to the booster capacitor 362 through the connecting switch 342 (e.g., the boosted intermediate current 392). The charges stored at the booster capacitor 362 can increase accordingly for generating the stage output voltage 214.

Once the booster capacitor 362 generates/provides the stage output voltage 214, the electronic device can discharge the first capacitor (e.g., after a fixed duration, such as at the end of a cycle or a period), such as illustrated by a loop back to block 602. The electronic device can utilize a complementary or mirroring circuit (not shown in FIG. 3 and FIG. 4) to repeat the above described process to generate/maintain the stage output voltage 214.

Charging the booster capacitor 362 using the source-secondary current 396 instead of or in addition to the boosted intermediate current 392 provides increased efficiency for the electronic device. The current from the input supply can be less costly than current from the doubler capacitor 322 in terms of availability and an amount of time/processes necessary to access the current. As such, using the source-secondary current 396 to charge the booster capacitor 362 can reduce the operating cost and improve the operating efficiency for the electronic device. Further, the electronic device can use the source-secondary current 396 to charge parasitic capacitor or make up for the loss across capacitors to ground (e.g., illustrated in FIG. 3 and FIG. 4 as capacitors shown in dashed lines, such as corresponding to loss caused by the Favrat stage in some embodiments).

FIG. 7 is a flow diagram illustrating an example method 700 of manufacturing an electronic device in accordance with an embodiment of the present technology. The method 700 can be for manufacturing the electronic device 200 of FIG. 2, the electronic device 300 of FIG. 3, the electronic device 400 of FIG. 4, a portion therein, or a combination thereof.

At block 702, circuit for the charge pump (e.g., the electronic device 200 of FIG. 2, the electronic device 300 of FIG. 3, the electronic device 400 of FIG. 4, a portion therein, or a combination thereof) can be provided. Providing the circuit can include forming the circuit (e.g., on a silicon wafer based on wafer-level processes), connecting or assembling circuitry components, or a combination thereof.

At block 722, providing the circuit can further include providing switches, such as the source switch 324 of FIG. 3 (e.g., the driver switch 422 of FIG. 4), the connecting switch 342 of FIG. 3 (e.g., the module first switch 426 of FIG. 4), the discharging switch 344 of FIG. 3 (e.g., the module second switch 428 of FIG. 4), or a combination thereof. The connecting switch 342 can be directly connected to the clock doubler/booster (e.g., the first capacitor therein) on one side/node and directly connected to the secondary booster on the opposite side/node of the booster capacitor 362. The source switch 324 can be directly connected to the input supply on one side/node and directly connected to the connecting switch 342 and the doubler capacitor 322 of FIG. 3 (e.g., the driver capacitor 424 of FIG. 4).

At block 704, the circuit can be configured for signal timings. For example, the circuit can be connected or manufactured (e.g., based on silicon-level processing or connecting circuit components) to implement the signal timings (e.g., as illustrated in FIG. 5). Also for example, firmware or software can be loaded for implementing the signal timings with the circuit.

At block 742, configuring the circuit can include configuring the charging signals. For example, the state machine or the controller circuit can be configured or the firmware/software can be loaded for controlling the clock signals 432 of FIG. 4, the clock master signals 434 of FIG. 4, or a combination thereof. Also for example, the circuit can be provided with circuits for generating periodic signals (e.g., for clock-type signals) for implementing the clock signals 432, the clock master signals 434, or a combination thereof. The charging signals can be configured relative to or for implementing the direct charging duration 502 of FIG. 5 (e.g., for keeping the clock signals 432 low and/or maintaining the clock master signals 434 during the direct charging duration 502 preceding immediately before a rising edge of the clock signals 432).

At block 744, configuring the circuit can include configuring the switch timing. For example, the state machine or the controller circuit can be configured or the firmware/software can be loaded for controlling the module first signal 436 of FIG. 4, the module second signal 438 of FIG. 4, or a combination thereof. The module first signal 436 can be configured to connect or close the module first switch 426 of FIG. 4 or the connecting switch 342 of FIG. 3 during the direct charging duration 502. In some embodiments, the module first signal 436 can be configured to revert to a previous level/state after the direct charging duration 502. The module second signal 438 can be configured to open or disconnect the module second switch 428 of FIG. 4 or the discharging switch 344 of FIG. 3 before the direct charging duration 502.

Figure 8:
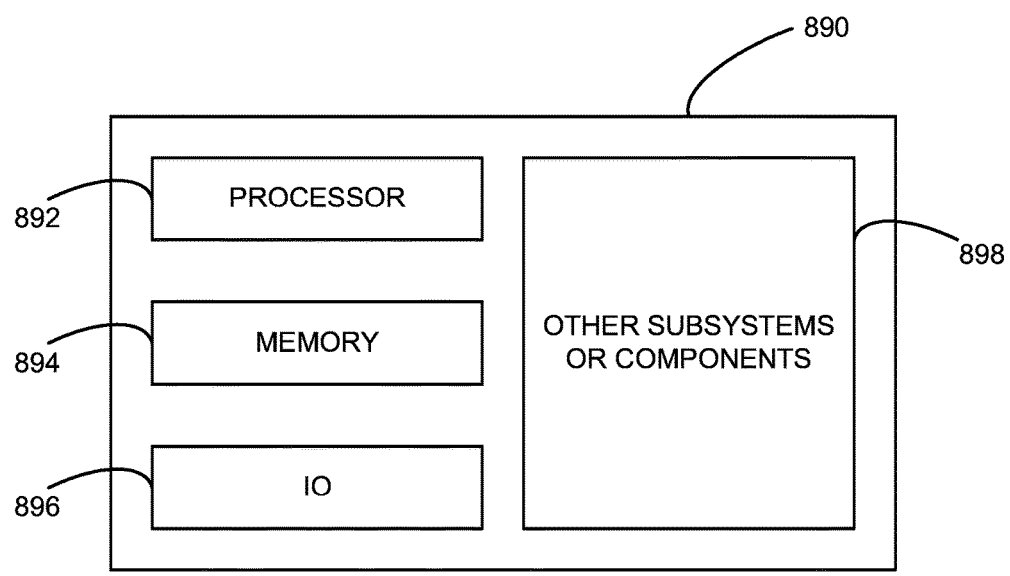
FIG. 8 is a schematic view of a system that includes an electronic device in accordance with embodiments of the present technology.

FIG. 8 is a schematic view of a system that includes an electronic device in accordance with embodiments of the present technology. Any one of the semiconductor devices having the features described above with reference to FIGS. 1-7 can be incorporated into any of a myriad of larger and/or more complex systems, a representative example of which is system 890 shown schematically in FIG. 8. The system 890 can include a processor 892, a memory 894 (e.g., SRAM, DRAM, flash, and/or other memory devices), input/output devices 896, and/or other subsystems or components 898. The semiconductor assemblies, devices, and device packages described above with reference to FIGS. 1-7 can be included in any of the elements shown in FIG. 8. The resulting system 890 can be configured to perform any of a wide variety of suitable computing, processing, storage, sensing, imaging, and/or other functions. Accordingly, representative examples of the system 890 include, without limitation, computers and/or other data processors, such as desktop computers, laptop computers, Internet appliances, hand-held devices (e.g., palm-top computers, wearable computers, cellular or mobile phones, personal digital assistants, music players, etc.), tablets, multi-processor systems, processor-based or programmable consumer electronics, network computers, and minicomputers. Additional representative examples of the system 890 include lights, cameras, vehicles, etc. With regard to these and other examples, the system 890 can be housed in a single unit or distributed over multiple interconnected units, e.g., through a communication network. The components of the system 890 can accordingly include local and/or remote memory storage devices and any of a wide variety of suitable computer-readable media.

From the foregoing, it will be appreciated that specific embodiments of the present technology have been described herein for purposes of illustration, but that various modifications may be made without deviating from the disclosure. In addition, certain aspects of the disclosure described in the context of particular embodiments may be combined or eliminated in other embodiments. Further, while advantages associated with certain embodiments have been described in the context of those embodiments, other embodiments may also exhibit such advantages. Not all embodiments need necessarily exhibit such advantages to fall within the scope of the present disclosure. Accordingly, the disclosure and associated technology can encompass other embodiments not expressly shown or described herein.

I claim:

1. A method of operating an electronic device, comprising:

closing a connecting switch at a beginning of a direct charging duration, the connecting switch configured to connect a clock doubler to a secondary booster, wherein the secondary booster is configured to generate a stage output voltage;

closing a source switch at the beginning of the direct charging duration for directly charging the secondary booster using an input voltage;

reverting voltage at the control node after the direct charging duration to a previous state;

keeping the connecting switch closed after the direct charging duration for further charging the secondary booster using the doubler capacitor, wherein the connecting switch is kept closed based on voltages at input and output terminals of the connecting switch; and keeping a clock signal at a low state during the direct charging duration, wherein:

the clock signal is configured to charge a doubler capacitor within the clock doubler, and the doubler capacitor is connected to the input voltage through the source switch.

2. The method of claim 1, wherein:

the clock signal is configured to charge the doubler capacitor included in a slave-booster of the clock doubler; and further comprising:

maintaining a clock master signal during the direct charging duration, wherein the clock master signal is configured to operate a master-controller that is configured to control the slave-booster without directly contributing to charging the doubler capacitor.

3. The method of claim 2, wherein maintaining the clock master signal includes maintaining the clock master signal at a state for closing the source switch when the clock signal is at the low state.

4. The method of claim 3, further comprising driving the clock master signal to the low state after the direct charging duration for operating the source switch including an NMOS device.

5. The method of claim 1, further comprising:

driving the clock signal to a high state after the direct charging duration for boosting electrical potential of the doubler capacitor; and charging the secondary booster based on the doubler capacitor.

6. The method of claim 1, wherein closing the connecting switch includes controlling a voltage at a control node of the connecting switch with a module signal.

7. The method of claim 1, further comprising maintaining the voltage at the control node after the direct charging duration for keeping the connecting switch closed.

* * * * *